United States Patent [19]
Assaf

[11] 4,370,860
[45] Feb. 1, 1983

[54] METHOD OF AND MEANS FOR GENERATING POWER FROM A HOT BRINE SOURCE

[75] Inventor: Gad Assaf, Rehovot, Israel

[73] Assignee: Solmat, Yavne, Israel

[21] Appl. No.: 155,971

[22] Filed: Jun. 3, 1980

[51] Int. Cl.³ .............................................. F03G 7/02
[52] U.S. Cl. ............................ 60/641.11; 60/641.8; 60/649
[58] Field of Search .............. 60/689, 649, 673, 641.1, 60/641.3, 641.8, 641.11, 325, 327, 398; 126/415, 416

[56] References Cited

U.S. PATENT DOCUMENTS

| | | | |
|---|---|---|---|
| 4,030,303 | 6/1977 | Kraus et al. | 60/688 |
| 4,041,710 | 8/1977 | Kraus et al. | 60/688 |
| 4,063,419 | 12/1977 | Garrett | 126/415 X |

FOREIGN PATENT DOCUMENTS 2819946 12/1978 Fed. Rep. of Germany ..... 60/641.8

OTHER PUBLICATIONS

Wright, Thomas R. Jr., What's Happening in Production, *World Oil*, Feb. 1, 1980, (p. 21).

*Primary Examiner*—Allen M. Ostrager
*Assistant Examiner*—Stephen F. Husar
*Attorney, Agent, or Firm*—Sandler & Greenblum

[57] ABSTRACT

Power is generated from a body of hot brine by injecting a liquid operating fluid, such as butane or Freon, into the brine at a depth where the hydrostatic pressure of the brine is approximately equal to the vapor pressure of the operating fluid at a temperature of the brine for producing a bubble regime in a vertically oriented lift tube whose lower end is immersed in the brine whereby working fluid is raised in the lift tube as the bubbles rise therein. The gaseous operating fluid is separated from the liquid working fluid which is returned to the body of brine, and the gaseous operating fluid is condensed in a condenser and returned in a liquid state for injection into the hot brine at the inlet of the lift tube. The working fluid that is raised in the lift tube is passed through an hydraulic turbine.

44 Claims, 9 Drawing Figures

METHOD OF AND MEANS FOR GENERATING POWER FROM A HOT BRINE SOURCE

DESCRIPTION

1. Technical Field

This invention relates to a method of and means for generating power from a hot brine heat source.

2. Background Art

Various techniques are known for constructing and maintaining solar ponds wherein the heat absorbed in the pond by solar radiation is stored in a layer of water below a halocline. A halocline is a stratified layer of water adjacent the surface of the pond in which the salinity increases monotonically with depth such that a rise in temperature in a given stratum of the halocline above the temperature in the overlying stratum does not reduce the density of the given stratum relative to the overlying stratum sufficiently to make the given stratum buoyant, with the result that convection currents due to temperature differentials are suppressed. As a consequence, the absorption of solar radiation by the halocline produces a temperature profile in the halocline which matches the salinity profile. Heat absorbed in the halocline is transferred by conduction across the interface between the halocline and the underlying heat storage layer which is convective and has a uniform salinity profile. The temperature profile in the heat storage layer is substantially uniform to a depth that depends on the rate at which solar radiation is absorbed by the halocline and the rate at which heat is withdrawn from the heat storage layer. Because the heat storage layer is mixed by the process that extracts heat from the layer, the temperature is uniform with depth, and the lighter and hotter water in the heat storage layer will remain captured between the halocline and the hypolimnion or deep water in the pond which will remain relatively cool.

Conventionally, indirect contact heat exchangers are used to extract heat from the heat storage layer usually by pumping hot brine from the heat storage layer into one side of a heat exchanger through the other side of which a working fluid is circulated. Heat transfer takes place through a metallic interface between the brine and the working fluid. The latter is usually an organic, low boiling point liquid, which is heated to a vapor and then expanded in a turbine which drives a generator to produce power. After the working fluid is exhausted from turbine, it is cooled and condensed in a condenser and then returned to the heat exchanger which functions as the boiler for the power plant. The cooled brine from the heat exchanger is returned at an appropriate level to the storage layer.

One of the basic problems with this approach to power generation is corrosion in the heat exchanger due to the hot brine. For example, a 20 to 25% salt concentration is not uncommon in the heat storage layer of a solar pond; and the use of brine of this concentration requires specially designed heat exchangers of special materials to resist the corrosive effect of the brine on the metal parts of the heat exchanger. Some special materials that are corrosion resistant have heat transmission characteristics that impede the heat transfer between the brine and the working fluid thereby reducing the thermal efficiency of the system, while other materials significantly increase the cost of the heat exchanger.

It is therefore an object of the present invention to provide a new and improved method of and means for generating power from a hot brine source wherein a direct contact heat exchanger is used for the purpose of avoiding the problem of corrosion and reducing cost.

DISCLOSURE OF THE INVENTION

In accordance with the present invention, power is generated from a body of hot, corrosive working fluid, such as brine, by injecting a liquid operating fluid, such as butane or Freon, into the hot working fluid at a depth not less than about one-third, and preferably, at a depth equal to the depth at which the hydrostatic pressure of the working fluid is approximately equal to the vapor pressure of the operating fluid at the temperature of the working fluid for producing a bubble regime in a vertically oriented lift tube whose lower end is disposed in the body of working fluid whereby working fluid is raised in the lift tube as the bubbles rise. At the top of the lift tube, the gaseous operating fluid is separated from the liquid working fluid which is returned to the pond, and the gaseous operating fluid is condensed and returned for injection into the working fluid at the lower end of the lift tube. The working fluid that is raised in the lift tube passes through an hydraulic turbine for generating power.

The level at which the operating fluid is injected into the hot working fluid is important in minimizing the length of the lift tube, and maximizing the efficiency. Ideally, the subcooled liquid operating fluid is injected just below the depth at which its vapor pressure at the temperature of the working fluid equals the hydrostatic head in the working fluid so that the liquid operating fluid is heated rapidly to its boiling point and vaporizes before traveling a significant distance. When the pressure in the condenser (determined by the vapor pressure of the operating fluid at the condenser temperature and the vapor pressure of the working fluid) is not less than atmospheric pressure, the working fluid raised by the lift tube into the condenser is returned to the body of working fluid through the turbine. On the other hand, the turbine may also be located at the entrance to the lift tube.

In order to insure the creation of a bubble regime in the lift tube (as distinguished from slug-flow) and thus maximize the efficiency of the lift, the quantity $H_l/(H_l+h)$ should be kept below about one-third where:

$h$ = height of liquid in the lift tube if injection of operating fluid were terminated (i.e., the height due to the condenser pressure); and $H_l$ = incremental increase in height of liquid in the lift tube due to injection of operating fluid.

The value of the parameter $H_l$, which is directly proportional to the work produced by the turbine, is dependent directly on the quantity of operating fluid injected into the lift tube and one the average specific volume of the vaporized operating fluid in the lift tube.

In order to maximize the efficiency of the system, the vapor pressure of the operating fluid at the condenser temperature should be much larger than the vapor pressure of the hot brine lifted into the condenser. If this is not the case, wasteful boiling of the working fluid in the separator of the condenser will take place, the latent heat of the working fluid evaporated in the condenser being lost without any gain in work output. Finally, the operating fluid should be selected such that its latent heat flux is much larger that the latent heat flux of the working fluid in order to enhance the thermodynamic efficiency of the system. If this criterion is not followed, an excessive amount of working fluid will vaporize in the lift tube and collect in bubbles of vaporized operating fluid. Thus, working fluid will vaporize in lift tube by extracting heat from the liquid working fluid without making a concommitant contribution to lifting the liquid working fluid.

The gaseous operating fluid in the condenser may be condensed by a direct contact process with water derived from a wind-mixed layer covering a solar pond whose storage layer is the source of the hot working fluid and which is protected against heat loss by a halocline. To the degree that the operating fluid is soluble in the working fluid, some loss of operating fluid will result. This loss can be reduced by a process that takes advantage of the very large difference between the heat conductivity of water and the molecular diffusivity of the soluble operating fluid in the water. One such process involves cooling the heated condenser water in an air cooler by spraying the water into droplets whose diameter and transit time in the cooler are selected to maximize the amount of heat removed from the droplets while minimizing the amount of operating fluid released to the atmosphere. Alternatively, the cooling water may be derived from an auxillary pond physically separate from the solar pond but arranged so that heat from the auxillary pond is rejected into the wind-mixed layer of the pond.

The invention also consists in an open cycle binary lift associated with a solar pond wherein an operating fluid is injected into the lower end of a lift tube connected to the heat storage layer of the solar pond at a depth below the surface of the pond no less than the depth at which the pressure of the water is approximately equal to the vapor pressure of the operating fluid at the temperature of the water entering the lift tube. The vaporization of the operating fluid produces gas bubbles in the lift tube which raise the water therein to a condenser connected to the upper end of the lift tube.

The invention also consists in a power plant comprising a solar pond, a vertical lift tube whose lower end is connected to the heat storage layer of the pond, and into which a volatile operating fluid is injected for reducing the density of the water in the lift tube by reason of bubbles created by the vaporization of the operating fluid, a condenser for condensing vaporized operating fluid at the top of the lift tube using water from the relatively cool layer covering the pond, and a hydraulic turbine through which water passing through the lift tube is returned to the pond.

BRIEF DESCRIPTION OF DRAWINGS

Embodiments of the invention are shown in the accompanying drawings wherein.

BEST MODE FOR CARRYING OUT THE INVENTION

Referring now to FIG. 1, reference numeral 10 designates a binary lift according to the present invention with only the essential parts shown for the purpose of developing the equations that describe the operation of the binary lift. Specifically, binary lift 10 comprises lift tube 12 which is vertically oriented and has its lower end open to a source 11 of hot working fluid such as water. The working fluid can be derived from a solar pond or solar lake or from a geothermal source. The hot water may also be in the form of surface water from the ocean which is piped to the lower end of the lift tube as in ocean thermal energy conversion (OTEC) devices.

Liquid operating fluid, which is immiscible in water, is injected into lower end 13 of lift tube 12 at a depth below surface 14 of the water no less than about one-third, and preferably about one-half, and most preferably no less than the depth at which the hydrostatic pressure is substantially equal to the sum of the vapor pressure of the operating fluid at the temperature of the hot water and the vapor pressure of the brine at the inlet. The depth of the lift tube below surface 14 is termed the "submergence", and is designated H.

Figure 1A:
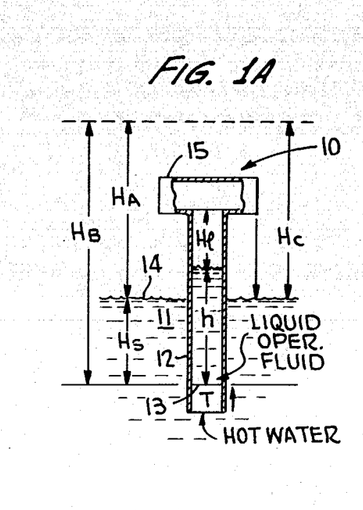
FIGS. 1A–D are vertical sections, in schematic form, of a lift tube according to the present invention showing turbine location as a function of the relationship between the condenser and atmospheric pressure.
Figure 1B:
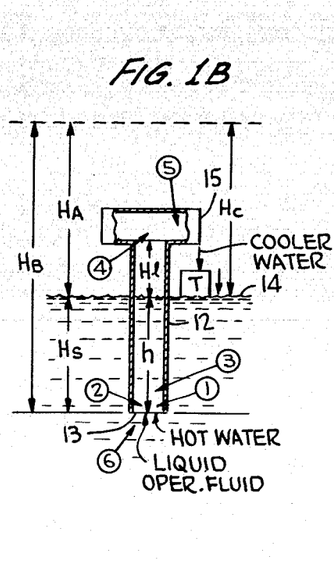
Figure 1C:
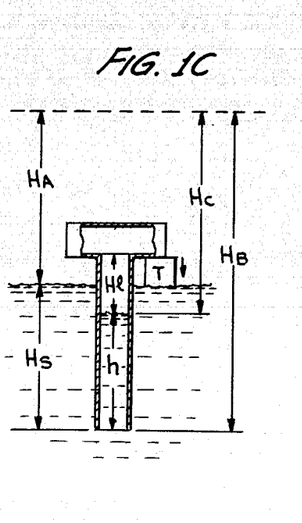
Figure 1D:
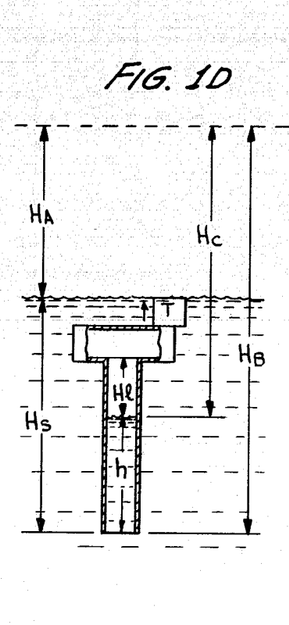
Figure 2:
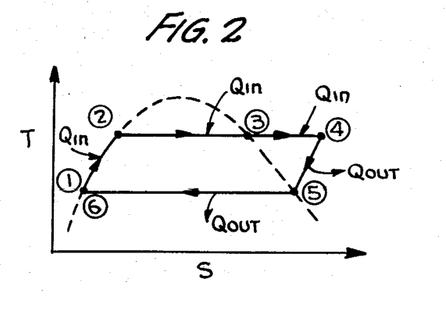
FIG. 2 is a temperature-entropy diagram for the operating fluid for the process shown in FIGS. 1A–D.

The liquid operating fluid, which is subcooled in state 1 (FIG. 2) below the temperature of the hot water, is heated at the lower end of the lift tube by the hot water from its subcooled temperature to the water temperature in a very short distance from the inlet to the tube. The liquid operating fluid in state 2 absorbs additional heat and vaporizes changing to state 3 at a location very close to end 13. The bubbles of vaporized operating fluid rise and expand in the lift tube and are further heated by the liquid to superheated state 4. By reason of the parameters of the lift tube, which are selected in accordance with the present invention, the flow within the tube is in the bubble regime (as distinguished from slug-flow), and a mass of water and bubbles are lifted into separator/condenser 15 at the upper end of the tube. The vaporized operating fluid is separated from the water, and condenses to a liquid changing from state 4 to state 5, and is further cooled to state 6 where it is ready for re-injection into end 13 of lift tube 12. The hot water lifted into the condenser is returned to the body of water through an hydraulic turbine. It is also possible to locate the turbine at the inlet to the lift tube.

Figure 3:
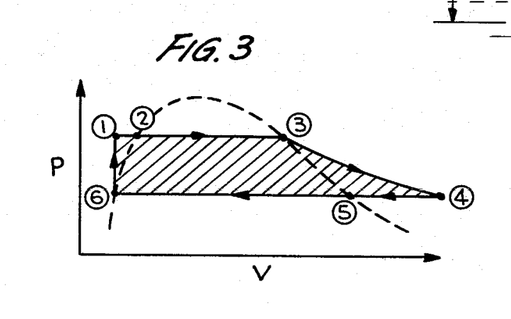
FIG. 3 is a pressure-volume diagram for the process of FIGS. 1A–D.

The pressure-volume diagram of the operating fluid is shown in FIG. 3. The expansion process from state 3 to state 4 is essentially a constant temperature expansion of the vapor bubbles as they rise in the lift tube at essentially constant temperature (i.e., the hot water temperature). The transition from state 4 to state 5 is a constant pressure process as is the transition from state 5 to state 6. The change from state 6 to state 1 is approximately isentropic, constant volume process. The net work available from the cycle is indicated by the cross-hatched region of FIG. 3.

The submergence H. is computed as follows:

$$H_s = [1/(\rho_w g)][P_B - P_A] = H_B - H_A \qquad (1)$$

where $H_B = H_C + h = (P_B)/\rho g$; $P_B$ is the "boiling" pressure at the inlet to the lift in Pascal (which is also the expected vapor pressure of the operating fluid and water vapor at the hot brine temperature), $P_A$ is atmospheric pressure in Pascal, g is the gravitational constant, and $\rho_w$ is the density of the brine.

When the pressure in the condenser is $P_C$, and before the operating fluid is introduced into the lift, the column of brine in the lift tube 12 is h, where $h = [1/\rho_w g][P_B - P_C]$.

While the operating fluid is being circulated and evaporation within the lift tube takes place, the average density of the mass of liquid and bubbles in the lift tube is less than the water density outside the lift tube with result that the fluid in the lift tube is raised through the displacement H which is given as follows:

$$H_l = h(\overline{v}\rho_w - 1) \quad (2)$$

where $\overline{v}$ is the mean density of the vapor-liquid mixture in the lift.

The mean density of the vapor-liquid mixture in the lift can be expressed as follows:

$$\overline{v} = (\overline{v}_g)x + (1-x)/\rho_w \quad (3)$$

where $\overline{v}_g$ is the average specific volume of the gas in the lift and x is the mass ratio of gas to liquid in the lift tube.

Introducing equation (3) into equation (2), and simplifying on the basis that $(\overline{v}_g)\rho_w$ is much greater than unity yields:

$$H_l = hx(\overline{v}_g)\rho_w \quad (4)$$

The efficiency of the lift may be defined as the ratio between the potential energy gained by the lifted water (gH) to the heat which leaves the lift at the condenser, namely $x(h_{fg})$ where $h_{fg}$ is the change in enthalpy associated with the state change of the operating liquid. This can be expressed as follows:

$$\eta = g(H_l)/x(h_{fg}) \quad (5)$$

This efficiency is approximately equal to 60% to 80% of the Carnot efficiency.

The actual operational conditions of the binary lift depend primarily on the temperature difference available between the hot water in the condenser and the particular operating fluid that is used. The height to which the liquid is raised is determined by the flow rate of the operating fluid which itself determines the mixing ratio x. The higher the rate of flow of the liquid operating fluid, the higher the elevation of the water will be. However, larger volumes of bubbles to fluid will increase the specific volume of the emulsion and beyond a threshold, the bubble flow in the lift becomes slug flow. The latter is very inefficient for lifting the hot brine because the gas bubbles "slip" through the liquid without imparting any significant upward velocity to the liquid.

In order to insure the presence of a bubble regime in the lift tube, two-phase flow theory indicates that the ratio of the volume of gas in the lift tube to the total volume of the lift tube (i.e., the volume of gas and liquid) should be less than about ⅓. In terms of the parameters described above, a bubble regime in the lift tube will be insured if:

$$H_l/(h + H_l) < \tfrac{1}{3} \quad (6)$$

A bubble flow regime will be enhanced and slug flow will be suppressed if the diameter of the lift tube is relatively large as compared to its length inasmuch as the slip rate for slug flow is proportional to the square root of the diameter of the tube.

The actual change in water temperature in the lift is small so that the temperature of the water returned to the body of water will be just slightly cooler than the water at the inlet to the lift tube. The change in water temperature T is as follows:

$$\delta T = x(h_{fg})/(C\rho_w) \quad (7)$$

where C is the specific heat of the liquid.

The following table summarizes the characteristics of a binary lift for various fluids such as pentane, Freon 113, butane and propane with water:

fluid: $T_h$:$T_c$:$\Delta T$:$P_B$:$P_C$:$H_l$:$h_{fg}$:$v_g$:$10^3 \times$: T:POWER: $\eta_c$%
pentane:50:40:10: 16:12:1: 4:0.3: 1:0.1: 13:3
pentane: 80:40:40: 36:12:12: 5:0.2: 3:0.3: 122:11
pentane: 90:40:50: 46:12:20: 5:0.2: 3:0.3: 200:14
R113: 50:40:10: 11:8:2: 2:0.2: 3:0.1: 16:3
R113: 82:42:40: 28:8:10: 2:0.1: 5:0.2: 100:11
R113: 88:38:50: 32:7:15: 2:0.1: 5:0.2: 150:14
R113: 24:8:16: 4:2:2: 2:0.4: 2:0.1: 20:6
butane: 52:41:10: 51:38:7: 4:0.1: 6:0.5: 66:3
butane: 82:41:41:105:38:44: 4:0.1: 9:0.8: 440:12
butane: 24:7:17: 23:13:5: 4:0.2: 2:0.2: 54:6
propane: 26:10:17: 97:62:17: 4:0.1: 8:0.7: 170:6 where $T_h$ and $T_c$ are the hot and cold water temperatures, respectively (Celsius), $\delta T = T_h - T_c$, the pressures are in meters of water, $h_{fg}$ is in $10^5$ joules/Kg, and the power is in kilowatts per square meter of the lift tube for a flow rate of 1.6 cubic meters of working fluid per second at a velocity of 2 meters per second (which are parameters about to be expected for large lifts.)

Figure 4:
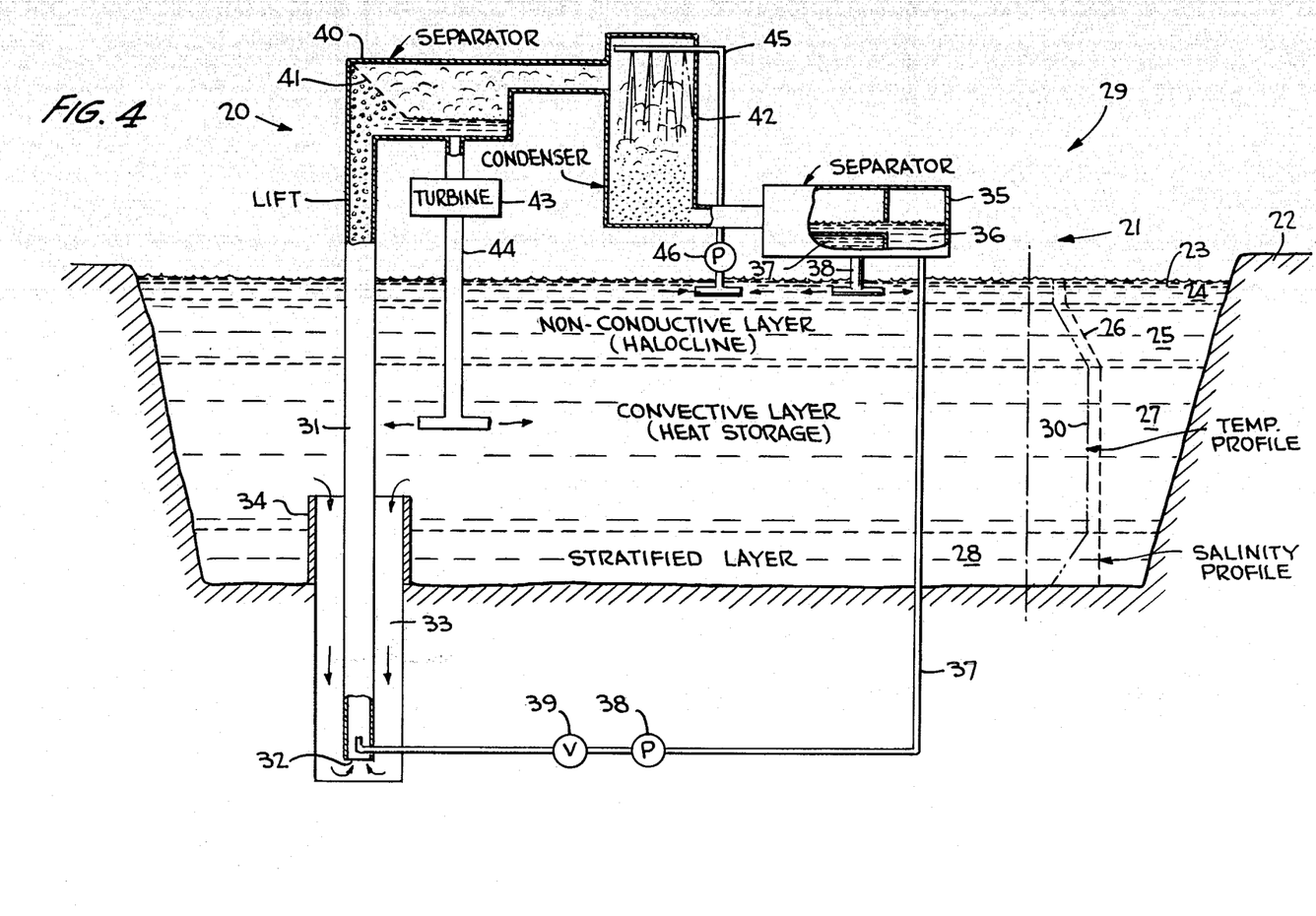
FIG. 4 is a schematic drawing in section showing an open cycle binary lift in accordance with the present invention for generating power, and showing an open loop direct contact condenser.

The preferred construction for an open cycle binary lift according to the present invention is designated by reference numeral 20 in FIG. 4. Lift 20 is used with solar pond 21 which is constructed in containment 22 and comprises an upper wind-mixed layer 23 just below the surface 24 of the pond, the wind mixed-layer being 15–30 cm deep. Below the wind mixed layer is non-convective layer 25 (halocline) whose salinity increases monotonically with depth as indicated by salinity profile 26. Below the halocline is a convective heat storage layer 27 whose salinity is constant; and below the heat storage layer is a stratified layer 28 of the same salinity as the heat storage layer.

The halocline is approximately 1–1.5 m deep while the depth of the lower convective and stratified layers toal about 7 or 8 meters depending upon the amount of heat storage which the pond is to supply.

Solar radiation 29 incident on the surface of the pond will be absorbed in the wind-mixed layer as well as in the halocline. As a consequence of the mixing in the wind mixed layer 24, the temperature in this layer will be substantially ambient temperature as indicated by temperature profile 30. Because the halocline is stratified, a temperature gradient as shown in by curve 30 can exist within the halocline, the hotter liquid in the lower region of the haloline being more dense by reason of salinity thereby preventing circulation from occuring due to thermal differences. Heat absorbed by the halocline is transferred by conduction across the interface between the halocline and the heat storage layer such that the heat storage layer is heated and stores heat absorbed by the halocline.

Solar radiation at a latitude corresponding to the southwestern part of the United States will input, on the average, about 250 watts per square meter, day and night, the year round. A pond of approximately one acre will produce steady power the year round at the rate of approximately 20 KW. The pond, however, will provide much more than this power on a peak basis and in fact will produce double this power during 6 months of the year.

As disclosed in co-pending application Ser. No. 225,004, filed Jan. 14, 1981, the larger the ratio of the salinity at the top of the halocline to the salinity at the bottom of the halocline, the greater will be the resistance of the halocline to wind mixing. Therefore, when the wind mixed layer is brackish sea water of 3–4% salinity, the salinity below the halocline will be of the order of magnitude 30%. This is a salinity commonly found in terminal lakes such as Great Salt Lake and the Dead Sea which are ideal candidates for conversion to solar ponds by the provision of a halocline in the manner indicated in FIG. 4.

Because of the absorption of solar radiation, the temperature of the heat storage layer will reach in excess of 90 degrees Celcius in steady state operation. The combination of such a high temperature and high salinity is a formidable obstacle to extracting heat from the heat storage layer using conventional indirect heat exchangers; and this obstacle is substantially overcome by the provision of binary lift 20 according to the present invention.

As shown in FIG. 4, lift 20 comprises a vertically oriented lift tube 31 whose lower end 32 is connected to the hot brine contained in heat storage layer 27 by way of a vertical well 33 that opens at 34 into the heat storage layer. Separator 35 contains a source of operating fluid such as pentane, Freon, etc. as described above. Operating fluid 36 in separator 35 is piped, via conduit 37 and pump 38, through metering valve 39 into the lower end 32 of the lift tube. Pump 38 and metering valve 39 thus constitute means to inject operating fluid into the lower end of the lift tube at a depth below the surface of the pond where the pressure of the hot brine is no less than the vapor pressure of the operating fluid at the temperature of the brine.

As explained above, the operating fluid quickly will be raised to the temperature of the hot brine at the lower end of the tube, and will vaporize producing gas bubbles in the lift tube. By the setting of metering valve 39, a bubble regime within tube 31 is established whereby the hot brine is raised from the lower end 32 of the lift tube into separator/condenser 40 at the upper end of the lift tube. Separator 40 includes perforated baffle 41 which separates the vaporized operating fluid from the hot brine permitting the vaporized operating fluid to pass into condenser 42 and the hot brine to be returned to the pond through turbine 43. Conduit 44 at the discharge end of the turbine returns the brine to a level where the temperature is just below the temperature of the brine entering the lift tube.

Condenser 42 is a closed tank at the top of which is spray header 45 to which water from the wind-mixed layer is pumped via pump 46 producing a spray of relatively cold water in the condenser for the purpose of condensing the gaseous operating fluid therein. The contents of condenser 42, namely, water sprayed into the condenser and the condensed operating fluid are transferred into separator 35. The operating fluid, being immisicible in the lighter than water, separates at 36 from the condenser water in source 35 and floats to the top while the water collects at the bottom of the separator at 37 and is returned via conduit 38 to the wind-mixed layer.

In order to ensure creation of a bubble regime in the lift tube and thus maximize the efficiency of the tube, the ratio of the volume of gaseous operating fluid in the lift tube to the total volume of gaseous operating fluid and brine therein should be less than about one-third. This ratio can be controlled by metering valve 39. The efficiency of the system is optimized when the vapor pressure of the operating fluid at the condenser temperature is much larger than the vapor pressure of a hot brine lifted into the condenser. If this relationship between the vapor pressure of the operating fluid and the vapor pressure of the hot brine is not realized, then the brine will boil at the separator and the heat of vaporization of the working fluid will be lost to the cooling water sprayed into condenser 42.

The operating fluid should be selected such that its latent heat flux is much larger than the latent heat flux of the working fluid in order to enhance the thermodynamic efficiency of the system. If this criterion is not followed, an excessive amount of working fluid will vaporize in the lift tube and collect in the bubbles of the vaporized operating fluid. Thus, water in the working fluid will vaporize in bubbles in the lift tube by extracting heat from the hot brine without making a concomitant contribution to lifting the brine. This last mentioned criterion can be extremely important in maximizing the thermodynamic efficiency of a lift tube. The thermodynamic efficiency of the operating fluid is about 85% of the Carnot efficiency while the thermodynamic efficiency of water is only about 50% of the Carnot efficiency. The total thermodynamic efficiency of the system will be:

$$\eta_t = f(\eta_o) + (1-f)\eta_w \qquad (8)$$
$$= \eta_c(0.85f + 0.5(1-f))$$

where $\eta_c$ is the Carnot efficiency and the fraction f is the ratio of heat used by the operating fluid at the larger efficiency to the sum of the heat used by the water operating at the smaller efficiency and the operating fluid is as follows:

$$f = 1/[1+(n_w m_w L_w)/(n_o m_o L_o)] \qquad (9)$$

where $n_o$ is the number of molecules of the operating fluid in the bubbles, $n_w$ is the number of molecules of water vapor, $m_o$ is the molecular weight of the operating fluid, and $m_w$ is the molecular weight of water vapor, $L_o$ is the latent heat of the operating fluid and $L_w$ is the latent heat of water.

In order to maximize the thermodynamic efficiency, the quantity f will have to be maximized which means that the ratio $(n_w m_w L_w)/(n_o m_o L_o)$ should be minimize. This ratio is given by the following expression:

$$(n_w m_w L_w)/(n_o m_o L_o) = [(P_w)(P_o)]/[(m_w L_w)/(m_o L_o)] \qquad (10)$$

where $P_w$ is the vapor pressure of water at the hot brine temperature, and $P_o$ is the vapor pressure of the operating fluid at the condenser temperature. Considering pentane, from the second line of the table given above, operating between 40–80 degrees Celcius, $P_w=0.5$ and $P_o=1.15$. Consequently, the ratio in Eq. (10) for pentane between these pressures is about 0.35. For butane, in the same temperature range, (third line from the bottom of the table) the ratio is about 0.22. Therefore, it appears that butane would provide a greater thermodynamic efficiency than would pentane.

The solubility of the operating fluid in water is likely to be a determining factor in the practicality of the arrangement shown in FIG. 4. Operating fluid will be lost by reason of the direct contact condenser arrangement shown on FIG. 4 since the cooling water is discharged to the wind-mixed layer. Any operating fluid dissolved in the condenser cooling will eventually be lost to the atmosphere. In order to minimize this loss, the arrangement shown in FIG. 5 can be utilized.

Figure 5:
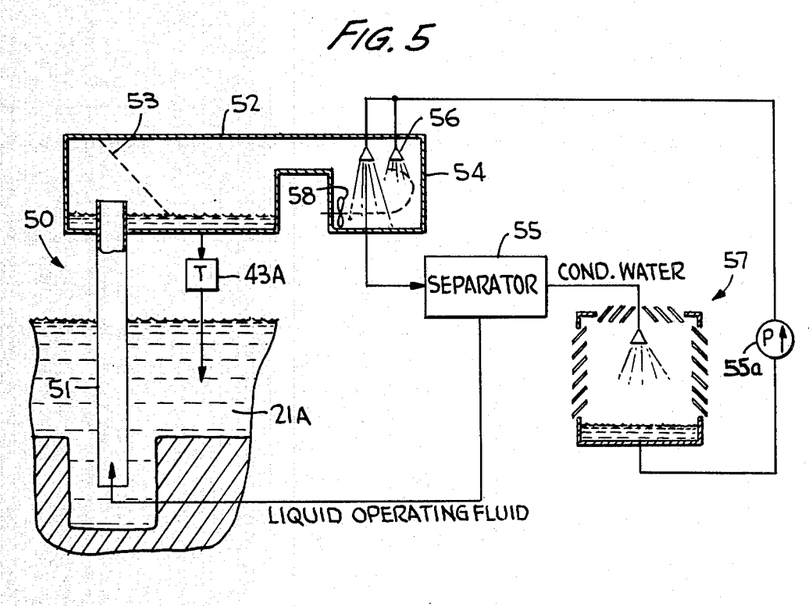
FIG. 5 is a schematic drawing of a binary lift according to the present invention provided with a closed loop cooling water system for the condenser in order to minimize the loss of operating fluid in the direct contact condenser.

Binary lift 50 in FIG. 5 includes solar pond 21A, hot brine from the solar pond entering at the bottom of lift tube 51 where liquid operating fluid from separator 52 is injected producing a bubble regime that raises hot brine into separator condenser 52 at the upper end of the lift tube. As described previously, the brine is returned through turbine 43A to the solar pond.

The gaseous operating fluid separated by a baffle 53 passes into direct contact condenser 54. In this case, however, the water furnished to the condenser is in a closed cycle. Specifically, the water is pumped at 55 into spray head 56 in the condenser thereby condensing the gaseous operating fluid which, together with the water in the condenser, is separated in separator 52. The condenser water containing dissolved operating fluid passes into an aircooled heat exchanger 57 while the operating fluid is returned to the lower level of the lift tube for use there.

Condenser 54 is designed to minimize the amount of operating fluid that dissolves in the cooling water. In condenser 54, a mixture of four phases exists: droplets of cooling water; water vapor which evaporates from the hot water source in the lift and in the separator attached to the top of the lift tube; vaporized operating fluid; and small droplets of condensed operating fluid. In the preferred embodiment, water is sprayed over only a portion of the condenser, say two-thirds of it. The falling water will induce a circulation of vapor within the condenser. This circulation may be enhanced by a small blower 58 near the bottom of the condenser. Small droplets of condensed operating water are carried by the vapor circulation to the other side of the condenser where such droplets will be trapped in a separate container (not shown) at the lower end of the condenser. The separation, via droplets and vapor circulation, will not be an absolute separation and additional separation will be done in separator 52 which utilizes the density difference between the water and the operating liquid.

Some of the condensed operating fluid will dissolve on the surface of the water droplets and penetrate into the droplets via diffusion. To minimize this effect, the size of the droplets is related to the height of the condenser in the manner indicated below. Penetration of dissolved operating fluid within a droplet is characterized by a distance or $r^*=(kt)^{\frac{1}{2}}$, where k is the diffusivity of operating fluid in water, and t is the time spent by the droplets in the condenser. The quantity t is equal to $h/v$ where h is the height of the condenser and v is the terminal velocity of the droplets within the condenser.

To make the condenser an efficient heat sink, the droplets should spend sufficient time in the condenser to absorb the heat required to condense the operating fluid. That is to say, the conductivity distance required to condense the operating fluid. That is to say, the conductivity distance $r_c=(k_t t)^{\frac{1}{2}}$, will not be very small compared with the droplet radius r. Fortunately, the heat conductivity of water is larger by two orders of magnitude as compared with the diffusivity of the dissolved gases. The droplet radius can then be determined such that $r=\frac{1}{2}(k_t t)^{\frac{1}{2}}\approx(1/20)(Kt)^{\frac{1}{2}}=r^*$, where $K=K_t/100$, the difussivity of the dissolved gas in water.

In summary, given the droplet radius r, the vapor pressure of the operating fluid in the condenser, the terminal velocity $v(r)$ can be determined. The condenser height h will be such the time t will be $t=h/v(r)=4r^2/K_t$.

Therefore, if $r=0.5$ mm, $K_t=10^{-7}$ m$^2$/sec, and $v(r)=5$ m/sec, we obtain $h=12.5$ m and $t=2.5$/sec. For this value $r^*=0.07$ mm. In such case, the droplets will absorb only 20% of the saturated value for the operating liquid.

The above procedure can be termed a kinematic separation. The same mechanism may also be used in the spray cooling tower as well. The droplets will spend enough time to give up their heat content to the air while this time will be too small to permit very much dissolved operating fluid from escaping.

Figure 6:
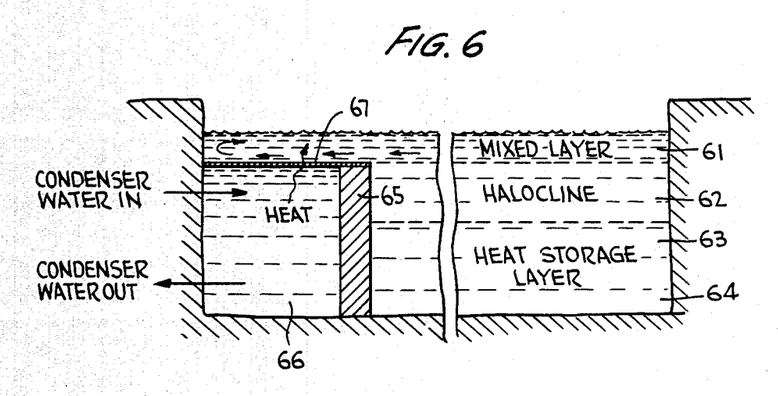
FIG. 6 is a schematic sectional view of a modified system for cooling the condensing water and preventing the escape of working fluid from the condensing water.

Under the condition that no operating fluid is to escape into the atmosphere, the arrangement shown in FIG. 6 can be followed. FIG. 6 shows solar pond 60 which comprises wind mixed layer 61, halocline 62 and heat storage layer 63 in containment 64. Layer 65 within the solar pond provides a volume of water 66 which is physically separated from the rest of the solar pond by the barrier and by a thin sheet 67 which is at the depth of the wind mixed layer. The volume of water 66 provides a source of condenser water for a closed cycle direct condenser of the type shown in FIGS. 4 and 5. In this case, heated water from the condenser is discharged into the volume 66, and the heat in this water is transferred by conduction through the sheets 67 into the wind mixed layer. The heating of the lower lever of the wind mixed layer creates a circulation within the wind mixed layer whereby the warmed water at the lower end of the mixed layer in contact with sheet 67 rises to the top of the pond and gives its heat to the atmosphere. The water in volume 66 is thus cooled and the cooled water is inputted to the condenser as indicated in FIG. 6.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

I claim:

1. A method for generating power from a body of hot liquid working fluid using a direct contact heat exchanger comprising steps of:
 (a) injecting liquid operating fluid into the working fluid at a depth which is more than about one-third of the depth at which the pressure of the working fluid is approximately equal to the vapor pressure of the operating fluid at the temperature of the working fluid for producing a bubble regime in a vertically oriented lift tube whose lower end is disposed in the working fluid whereby working fluid in the lift tube is raised as the bubbles rise;

(b) separating the gaseous operating fluid from the liquid working fluid at the top of the lift tube, and returning the latter to the body of hot liquid working fluid;

(c) condensing the gaseous operating fluid and returning it for injection into the working fluid at the lower end of the lift tube; and (d) passing working fluid lifted in the lift tube through an hydraulic turbine for generating power.

2. A method according to claim 1 wherein the liquid operating fluid is injected into the working fluid at a depth not less than the depth at which the pressure of working fluid is approximately equal to the vapor pressure of the operating fluid at the temperature of the working fluid.

3. A method according to claim 2 wherein the amount of operating fluid injected into the working fluid is adjusted so that the ratio of the volume of gaseous operating fluid and working fluid is less than about one-third.

4. A method according to claim 3 wherein the vapor pressure of the operating fluid at the condenser temperature is larger than the vapor pressure of the hot working fluid lifted into the condenser.

5. A method according to claim 4 wherein the operating fluid has a latent heat flux much larger than the latent heat flux of the working fluid.

6. A method according to claim 1 including steps of condensing the gaseous operating fluid using relatively cool liquid working fluid.

7. A method according to claim 1 including the step of condensing the gaseous operating fluid by direct contact with relatively cool water, separating the condensed operating fluid from the condenser water and cooling the condenser water in an aircooled spray before returning the cooled water to the condenser, the size of the droplets of the spray and the duration of the exposure of the droplets to the air being such as to maximize heat exchange between the droplets and the cooling air and to minimize the solubility of operating fluid in the cooling water.

8. A binary lift for use with a solar pond having an upper layer whose salinity increases montonically with depth for establishing a non-convecting halocline adjacent to the surface of the pond, and having a lower heat storage layer that stores heat absorbed by the halocline due to incident solar radiation and forms a source of hot brine, the binary lift comprising:

(a) a vertically oriented lift tube whose lower end is connected to the hot brine;

(b) a source of liquid operating fluid;

(c) means to inject liquid operating fluid into the lower end of the lift tube at a depth below the surface of the pond where the pressure of the hot brine is no less than about one-third of the vapor pressure of the operating fluid at the temperature of the brine entering the lift tube for vaporizing the operating fluid and producing gas bubbles in the lift tube;

(d) means connected to the upper end of a lift tube for receiving brine and gas lifted in the lift tube, said last named means separating the gaseous operating fluid from the brine and returning the latter to the pond, and condensing the operating fluid; and (e) means for returning the condensed operating fluid to said source.

9. A binary lift according to claim 8 wherein the vapor pressure of the operating fluid at the temperature of the means connected to the upper end of the lift tube is large compared to the vapor pressure of the lifted brine.

10. A binary lift according to claim 9 wherein the depth at which the liquid operating fluid is injected into the lift tube is about equal to the depth at which the pressure of the working fluid is approximately equal to the vapor pressure of the operating fluid at the temperature of the working fluid.

11. A binary lift according to claim 8 in combination with an hydraulic turbine responsive to the flow of brine raised in the lift tube.

12. A binary lift according to claim 8 wherein the separated brine from the condenser is returned to the heat storage layer of the pond at a depth where the temperature of the water in the pond is approximately equal to the temperature of the separated water from the condenser.

13. A binary lift according to claim 12 wherein the rate of operating fluid injected into the water is such that a bubble regime is established in the lift tube.

14. A binary lift according to claim 13 wherein the fraction of gas in the lift to the total volume in the lift is not more than about one-third.

15. A binary lift according to claim 8 wherein the pond has a wind-mixed layer at its surface of a uniform temperature below the temperature of the water entering the lower end of the lift tube and water from the wind-mixed layer is used to cool the condenser.

16. A binary lift according to claim 13 wherein the vapor pressure of the operating fluid in the condenser at the temperature thereof exceeds atmospheric pressure, and wherein the brine separated from the operating fluid is returned to the pond through hydraulic turbine means.

17. A binary lift according to claim 8 wherein the vapor pressure of the operating fluid in the condenser at the temperature thereof does not exceed atmospheric pressure, and hydraulic turbine means are associated with the brine entering lift tube.

18. A binary lift according to claim 16 wherein the ratio of the length of the lift tube to the submergence is less than about one third.

19. A binary lift according to claim 8 wherein the pond has a wind-mixed layer at its surface of a uniform temperature below the temperature of the brine entering the lift tube and water from the wind-mixed layer is used to cool the condenser.

20. An open cycle binary lift according to claim 19 including means for returning the water lifted in the lift tube to the heat storage layer, means in the lift tube to the heat storage layer, means for pumping water from the wind-mixed layer into the condenser into direct contact with the separated gaseous operating fluid, means for separating condensed operating fluid from the condenser water, and means for returning the condensed water to the wind-mixed layer.

21. An open cycle binary lift according to claim 8 wherein the means associated with the condenser for separating the gaseous operating fluid from the water and condensing the operating fluid includes cooling water in direct contact with the gaseous operating fluid.

22. A binary lift according to claim 21 wherein the cooling water is circulated in a loop that includes a cooling tower into which the cooling water is sprayed after being removed from the condenser, the size of the sprayed droplets and the duration of exposure of the droplets to air being such as to minimize the amount of working fluid evaporated to the cooling air and maximizing the amount of heat removed from the droplets.

23. A binary lift according to claim 22 wherein the pond includes an auxiliary cooling pond associated with the solar pond, means for withdrawing water from the auxiliary pond and supplying it to the condenser, means for returning cooling water to the auxiliary pond, and means for transferring heat from the cooling pond into a wind-mixed layer at the surface of the pond.

24. The invention of claim 21 wherein the working fluid is water and the operating fluid is immiscible in water.

25. The invention of claim 24 wherein the operating fluid is pentane.

26. The invention of claim 24 wherein the operating fluid is butane.

27. The invention of claim 24 wherein the operating fluid is propane.

28. The invention of claim 24 wherein the operating fluid is Freon.

29. In a binary lift of the type comprising a source of cool working fluid, a source of hot working fluid connected to the lower end of a vertically oriented lift tube, source of volatile operating fluid that is injected into the hot working fluid at the lower end of the tube thereby vaporizing the operating fluid and reducing the average density in the lift tube below the density of the hot working fluid outside the tube whereby the working fluid is lifted into a separator/condenser at the top of the lift tube where the working fluid is separated from the gaseous operating fluid and returned to the source of hot working fluid, and vaporized operating fluid is condensed and returned to the source of operating fluid, the improvement comprising injecting the operating fluid into the hot working fluid in the lift tube at a vertical location at which the pressure of the working fluid is not less that about one-third of the vapor pressure of the operating fluid at the temperature of the hot working fluid.

30. The invention of claim 29 wherein the depth at which the operating fluid is injected into the lift tube is about equal to the depth at which the pressure of the working fluid is approximately equal to the vapor pressure of the operating fluid at the temperature of the working fluid.

31. The invention of claim 29 including cooling the condenser with the cool working fluid, and discharging working fluid used to cool the condenser into the source of cool working fluid.

32. The invention of claim 31 wherein the temperature of the cool working fluid is such that the vapor pressure of the operating fluid in the condenser exceeds atmospheric pressure, and the working fluid separated from the lift tube first passes through an hydraulic turbine.

33. The invention of claim 31 wherein the temperature of the cool working fluid is such that the vapor pressure of the operating fluid in the condenser is below atmospheric pressure.

34. The invention of claim 29 wherein the working fluid is water and the source of hot working fluid is the heat storage layer of a solar pond.

35. The invention of claim 33 wherein the source of cool working fluid is associated with a halocline located above the heat storage layer.

36. The invention of claim 34 wherein the source of cool working fluid is associated with deep water below the heat storage level.

37. The invention of claim 34 wherein the lift tube extends above the surface of the pond, and working fluid lifted into the condenser is returned to the heat storage layer.

38. A power plant comprising:
(a) a solar pond having a heat storage layer of relatively hot water and also having a layer of relatively cool water;
(c) a vertical lift tube associated with a pond, the lower end of the tube being connected to the heat storage layer;
(d) means connected to the upper end of the lift tube for separating the water raised in the lift tube from the vaporized operating fluid and returning the water to the heat storage layer;
(e) a condenser for condensing the separated operating fluid;
(f) means to supply water from the relatively cool layer to the condenser for condensing the vaporized operating fluid;
(g) means for returning condensed operating fluid to the inlet to the lift tube; and
(h) hydraulic turbine means for generating power in response to the flow of water lifted in the tube.

39. A power plant according to claim 38 wherein the depth at which the operating fluid is injected into the lift tube is about equal to the depth at which the pressure of the working fluid is approximately equal to the vapor pressure of the operating fluid at the temperature of the working fluid.

40. A power plant according to claim 38 wherein the heat storage layer is covered by a halocline.

41. A power plant according to claim 38 wherein the condenser includes means for spraying the vapor with the cool water.

42. A power plant according to claim 38 wherein the relatively cool layer is associated with a halocline located above the heat storage layer.

43. A power plant according to claim 38 wherein the relatively cool layer is associated with a halocline located above the heat storage layer.

44. A power plant according to claim 38 wherein the relatively cool layer is below the heat storage layer.

* * * * *

UNITED STATES PATENT AND TRADEMARK OFFICE
CERTIFICATE OF CORRECTION

PATENT NO. : 4,370,860
DATED : February 1, 1983
INVENTOR(S) : Gad ASSAF

It is certified that error appears in the above-identified patent and that said Letters Patent is hereby corrected as shown below:

At Column 2, line 56, "one" should read ---on---.

At Column 6, line 55, "toal" should read ---total---.

At Column 8, line 3, "the" should read ---and---.

At Column 8, line 61, "minimize" should read ---minimized---.

At Column 10, lines 2-3, ---"That is to say, the conductivity distance required to condense the operating fluid"--- should be omitted.

Signed and Sealed this

Third Day of January 1984

[SEAL]

*Attest:*

*Attesting Officer*

GERALD J. MOSSINGHOFF

*Commissioner of Patents and Trademarks*